(12) United States Patent
Masaki

(10) Patent No.: US 6,833,531 B1
(45) Date of Patent: Dec. 21, 2004

(54) TEMPERATURE ADJUSTING DEVICE FOR A SOLDERING IRON

(75) Inventor: Hiroyuki Masaki, Shijonawate (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 10/635,802

(22) Filed: Aug. 5, 2003

(51) Int. Cl.$^7$ .............................. B23K 3/00; H05B 1/02
(52) U.S. Cl. ...................... 219/241; 219/506; 219/494; 338/196; 338/166; 228/51; 116/294
(58) Field of Search ................................ 219/241, 506, 219/494; 338/196, 166; 116/294, 295, 311; 200/43.04; 228/51

(56) References Cited

U.S. PATENT DOCUMENTS

| | | | | | |
|---|---|---|---|---|---|
| 1,950,341 | A | * | 3/1934 | Foothorap | 338/166 |
| 4,231,512 | A | * | 11/1980 | Johnson | 236/47 |
| 4,861,967 | A | * | 8/1989 | Yoshimura | 219/241 |
| 4,891,497 | A | * | 1/1990 | Yoshimura | 219/241 |
| 4,945,210 | A | * | 7/1990 | Yoshimura | 219/241 |
| 5,305,418 | A | * | 4/1994 | Tuttle | 392/449 |

FOREIGN PATENT DOCUMENTS

| | | | |
|---|---|---|---|
| JP | 57-182122 | * | 11/1982 |
| JP | 3034356 U | | 2/1997 |

* cited by examiner

*Primary Examiner*—John A. Jeffery
(74) *Attorney, Agent, or Firm*—Squire, Sanders & Dempsey, LLP

(57) ABSTRACT

Disclosed is a temperature adjusting device for adjusting or setting temperature of a soldering iron, with the adjustment or setting being allowed to a particular authorized operator.

The device comprises a temperature control section having a moveable member which is moveable to change an electric parameter, such as a resistance, as a function of the movement of the moveable member, the temperature control section controlling the temperature of the soldering iron in accordance with the electric parameter; a manipulation member detachably coupled to the moveable member to move the moveable member to change the electric parameter; and an indicator interrelated with the moveable member to indicate an adjusted temperature, the indicator being capable of making the indication even when the manipulation member has been detached from moveable member.

24 Claims, 10 Drawing Sheets

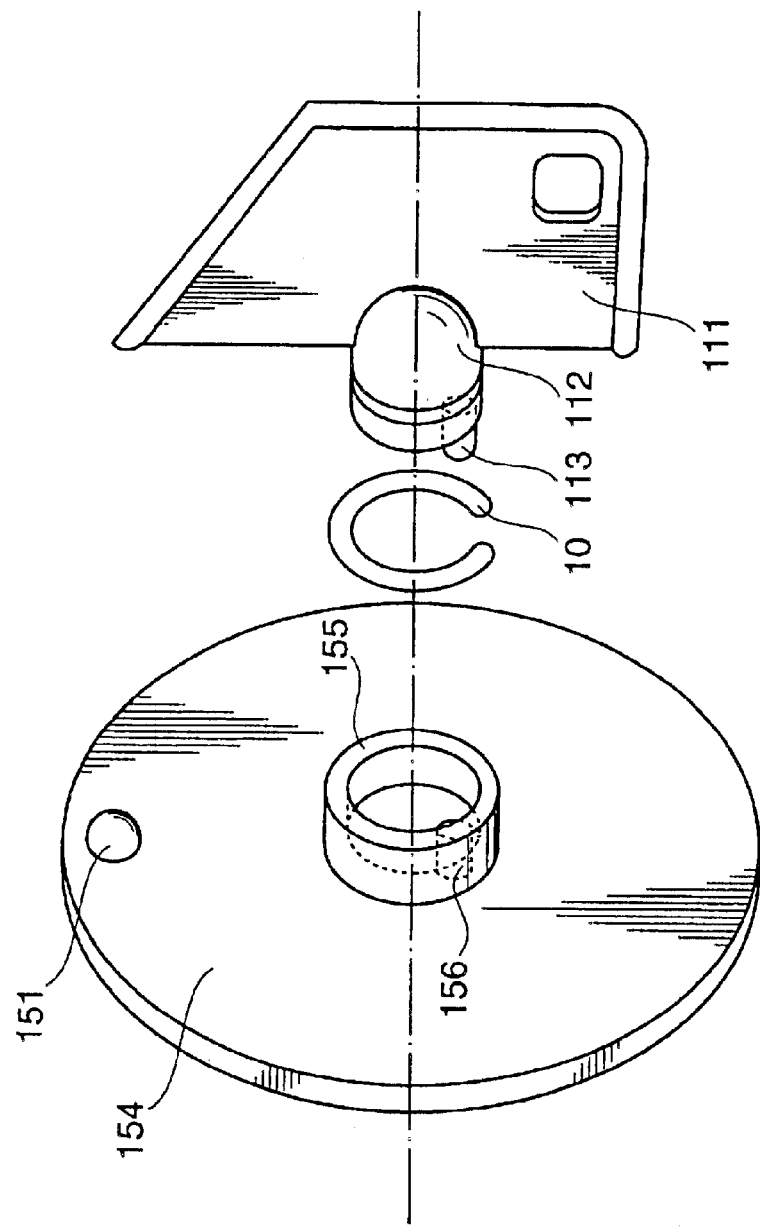

TEMPERATURE ADJUSTING DEVICE FOR A SOLDERING IRON

FIELD OF THE INVENTION

The present invention relates to a temperature adjusting device for adjusting heating temperature of a tip of a soldering iron which is used for soldering, desoldering or reworking of electric parts.

BACKGROUND OF THE INVENTION

In the assembly, disassembly and reworking of various electric and electronic apparatus, soldering or desoldering process is often employed for mechanically and electrically bonding or removing electric parts or leads to or from a substrate such as a printed circuit board. Such soldering and desoldering is usually carried out manually with a hand soldering or desoldering device having a tip of a soldering iron which is heated to a desired temperature to melt solder on the electric parts and leads. Such a hand soldering or desoldering device is electrically connected with a temperature adjusting device for adjusting the temperature of the tip. The temperature adjusting device is provided with a temperature indicator including a scale and a manipulation member such as a knob having a pointer integrally formed thereon. Thus, the worker or operator may set a desired temperature of the tip by operating the manipulation member to register the pointer with a desired temperature scale.

The temperature of the tip must be set and kept at a value not to damage the circuit elements such as IC, while enabling soldering or desoldering. However, workers who perform the soldering or desoldering operation, generally tend to set the temperature of the tip at a value higher than proper one to make the soldering or desoldering operation efficient if they are allowed to adjust the temperature of the tip.

To prevent this, a conventional device is arranged such that the manipulation member can be removed from the temperature adjusting device to be kept under custody of an authorized operator who is authorized to adjust the temperature of the tip. Another conventional device is provided with a lock mechanism for blocking the temperature adjusting operation unless the locking is released by the authorized operator. The lock mechanism may provide with a card reader for locking and unlocking the temperature adjusting mechanism.

However, the removable knob type device has a disadvantage that the set temperature is not indicated and can not be confirmed once the knob is removed. As the set temperature is not indicated while the knob has been taken away, it can not be recognized even when the temperature has been changed by an unauthorized person. In the case of the card reading lock mechanism, the authorized operator must lock and unlock the temperature adjusting mechanism every time he or she makes the adjustment. In addition, provision of the card lock mechanism makes the temperature adjusting device complicated, resulting in increase of the cost for manufacturing the device.

SUMMARY OF THE INVENTION

Accordingly, an object of the present invention is to provide an improved temperature adjusting device for adjusting or setting temperature of a soldering iron, with the adjustment or setting being allowed to a particular authorized operator.

Another object of the present invention is to provide a temperature adjusting device for adjusting or setting temperature of a soldering iron which can be accessed by a particular authorized operator for the adjustment or setting.

Still another object of the present invention to provide a temperature adjusting device for adjusting or setting temperature of a soldering iron and which is simple in construction and operation for the access by an authorized operator for the adjustment or setting of the temperature.

To attain one or more of the object mentioned above, a temperature adjusting device according to the present invention comprises a temperature control section having a moveable member which is moveable to change an electric parameter as a function of the movement of the moveable member, the temperature control section controlling the temperature of the soldering iron in accordance with the electric parameter; a manipulation member detachably coupled to the moveable member to move the moveable member to change the electric parameter; and an indicator interrelated with the moveable member to indicate an adjusted temperature, the indicator being capable of making the indication even when the manipulation member has been detached from the moveable member.

According to the invention, an authorized operator may adjust or set the temperature of the soldering iron by coupling the manipulation member with the moveable and operating the manipulation member. After the adjustment or setting of the temperature, the operator may detach the manipulation member and take it away to keep it under custody of the operator. Then, the worker performing soldering or desoldering operation can not change the temperature so that the temperature is kept at a proper value set by the authorized operator. In addition, the indicator is capable of making the indication even when the manipulation member has been detached from the moveable member. Accordingly, the set temperature can be confirmed at any time.

These and other objects, features and advantages of the present invention will become more apparent upon reading the following detailed description along with the accompanying drawings.

BRIEF DESCRIPTION OF THE DRAWINGS

FIG. 10 is a partial exploded view showing the temperature setting and indicating mechanism of the temperature adjusting device shown in FIG. 3.

DETAILED DESCRIPTION OF PREFERRED EMBODIMENTS OF THE INVENTION

Figure 1:
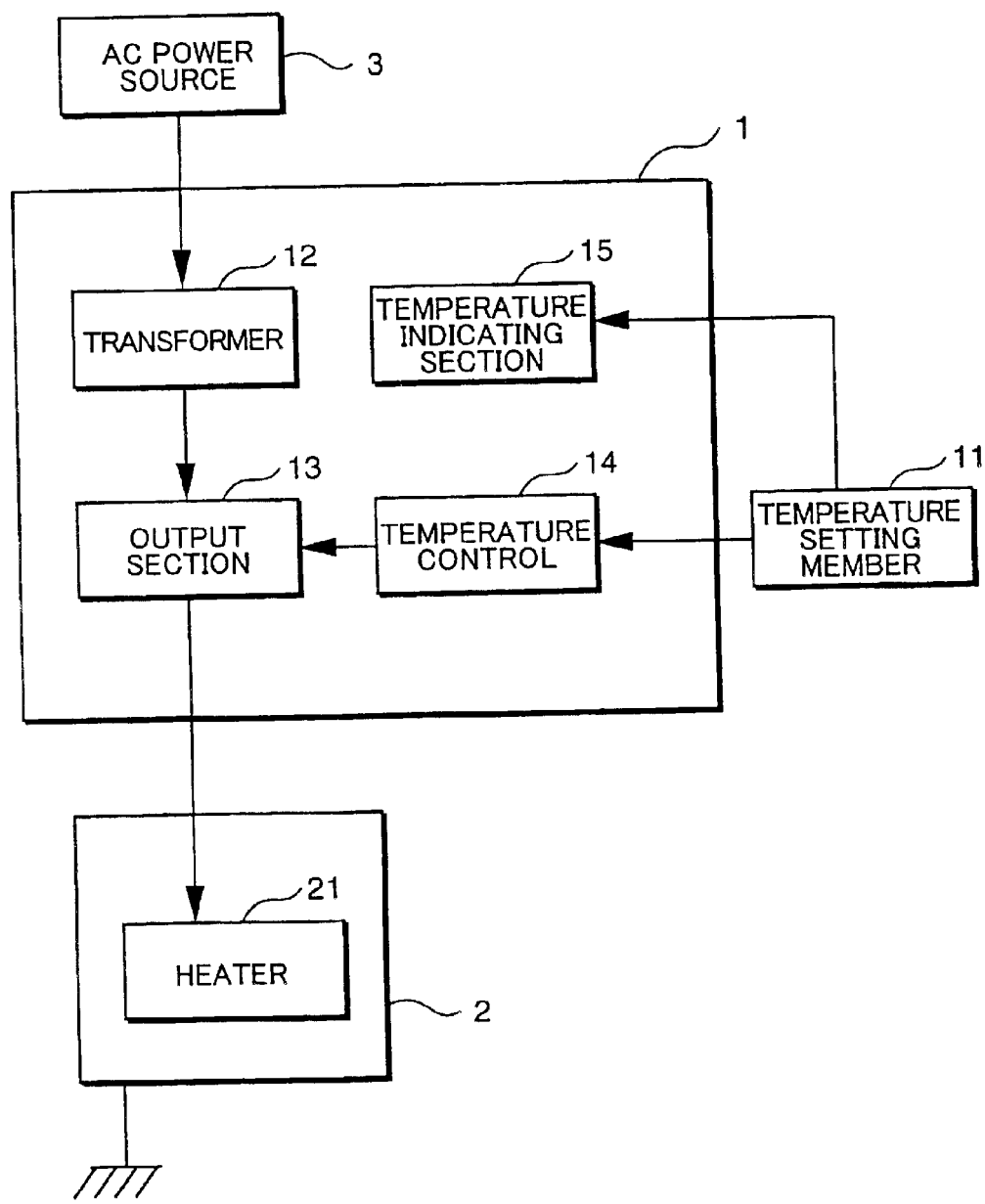
FIG. 1 is a block diagram schematically illustrating the general arrangement of a temperature adjusting device according to an embodiment of the present invention.

With reference to FIG. 1, a temperature adjusting device 1 according to a first embodiment of the present invention comprises a temperature setting member 11, a transformer 12 for transforming a voltage of a commercial AC power source 3 to a desired voltage, an output section 13 for energizing a heater 21 for heating the tip of a soldering iron 2, a temperature control 14 for controlling the output of the output section 13, and a temperature indicating section 15 for indicating a temperature set by means of the temperature setting member 11. The temperature setting member 11 is detachably coupled to the mechanical part of the temperature control section 14 and the temperature indicating section 15 as will be described in more detail later. The temperature control 14 controls the output section 13 such that the tip of the soldering iron 2 is heated by the heater 21 to a temperature set by the temperature setting member 11. The temperature indicating section 15 is to be coupled with the temperature setting member 11 to indicate a temperature set by the temperature setting member, with the indication remaining even after the temperature setting member 11 is detached and taken away from the temperature adjusting device of the embodiment.

Figure 2:
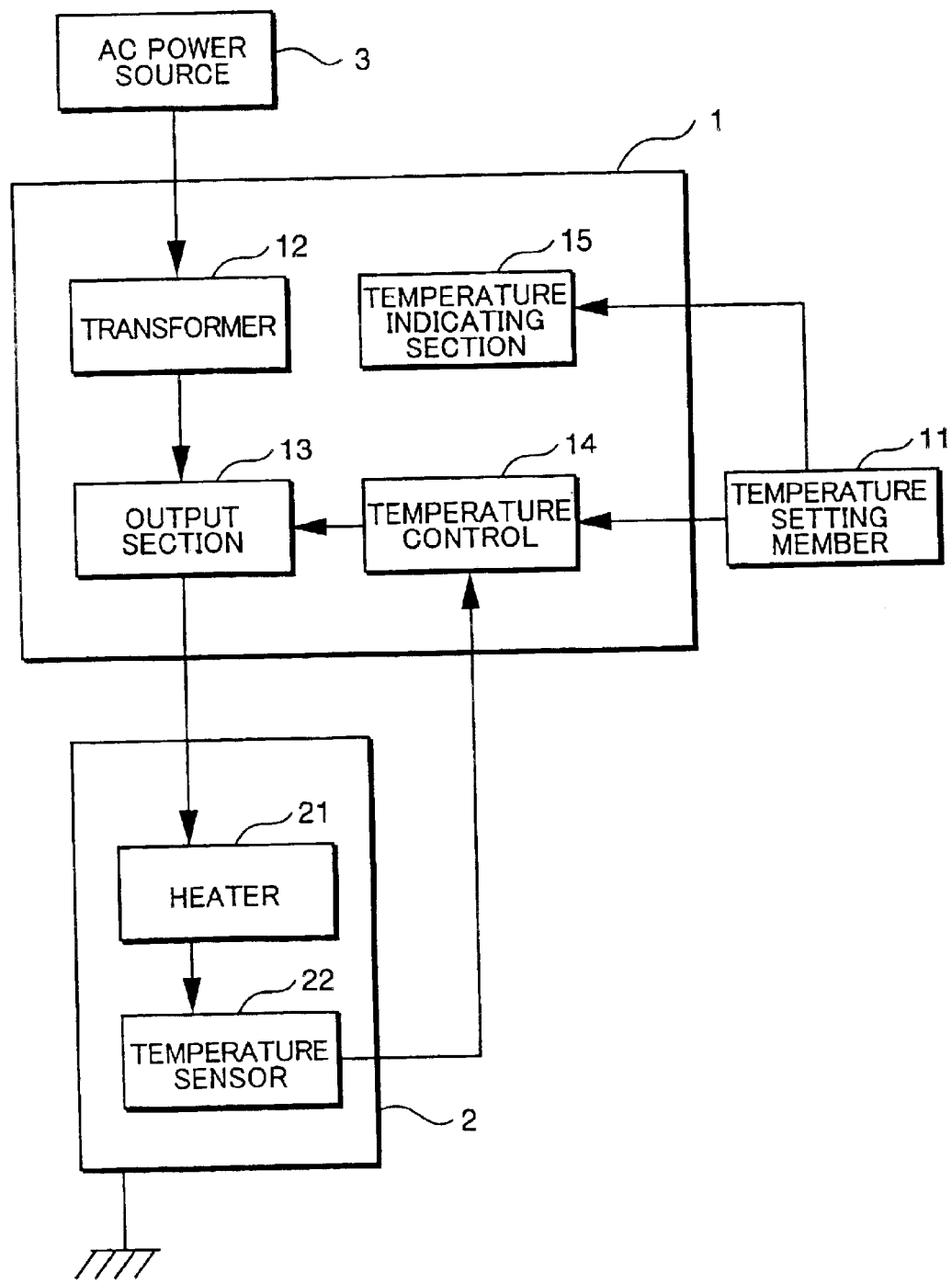
FIG. 2 is a block diagram schematically illustrating a general arrangement of a modified temperature adjusting device according to another embodiment of the present invention.

The temperature adjusting device may be modified as shown in FIG. 2 wherein a temperature sensor 22 is provided to detect the temperature of the tip of the soldering iron 2. The output of the temperature sensor 22 is supplied to the temperature control 14 wherein the output of the temperature sensor 22 is compared with the set temperature to control the output section 13 such that the temperature of the tip assumes the set value. In this case, if the temperature indicating section 15 is arranged to receive the output of the temperature sensor 22 to indicate the actual temperature of the tip, an operator who has been authorized to adjust the temperature, can see and cope with it when the actual temperature inadvertently changes from the set temperature by any accident.

Figure 3:
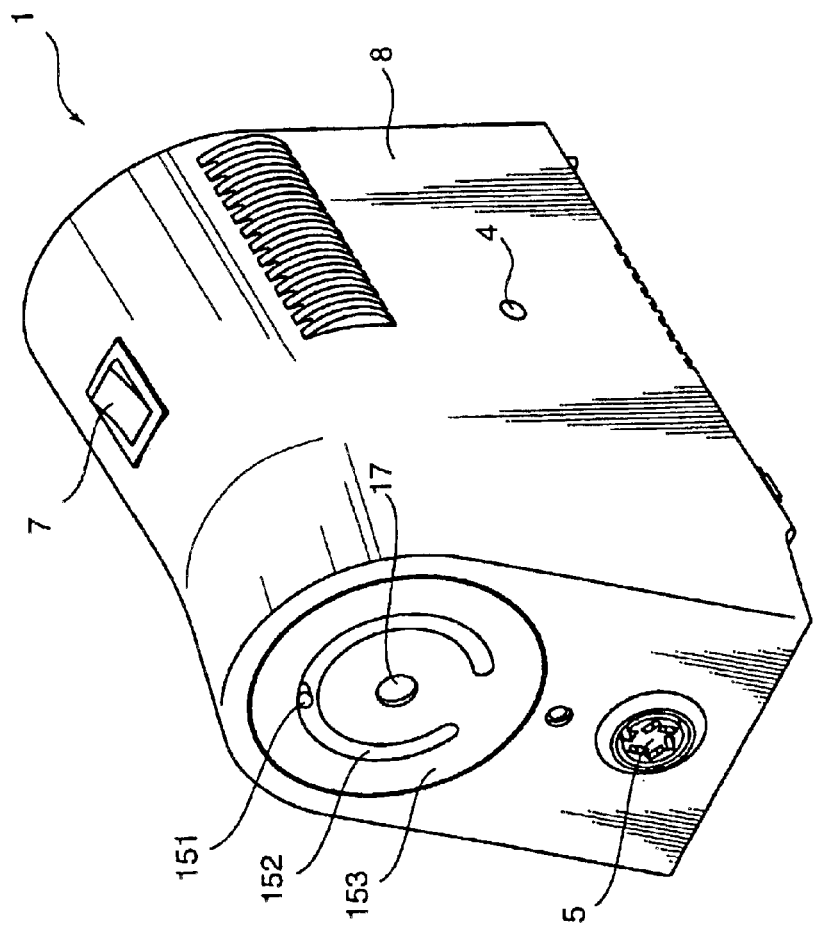
FIG. 3 is a perspective view of a temperature adjusting device of the embodiment.
Figure 4:
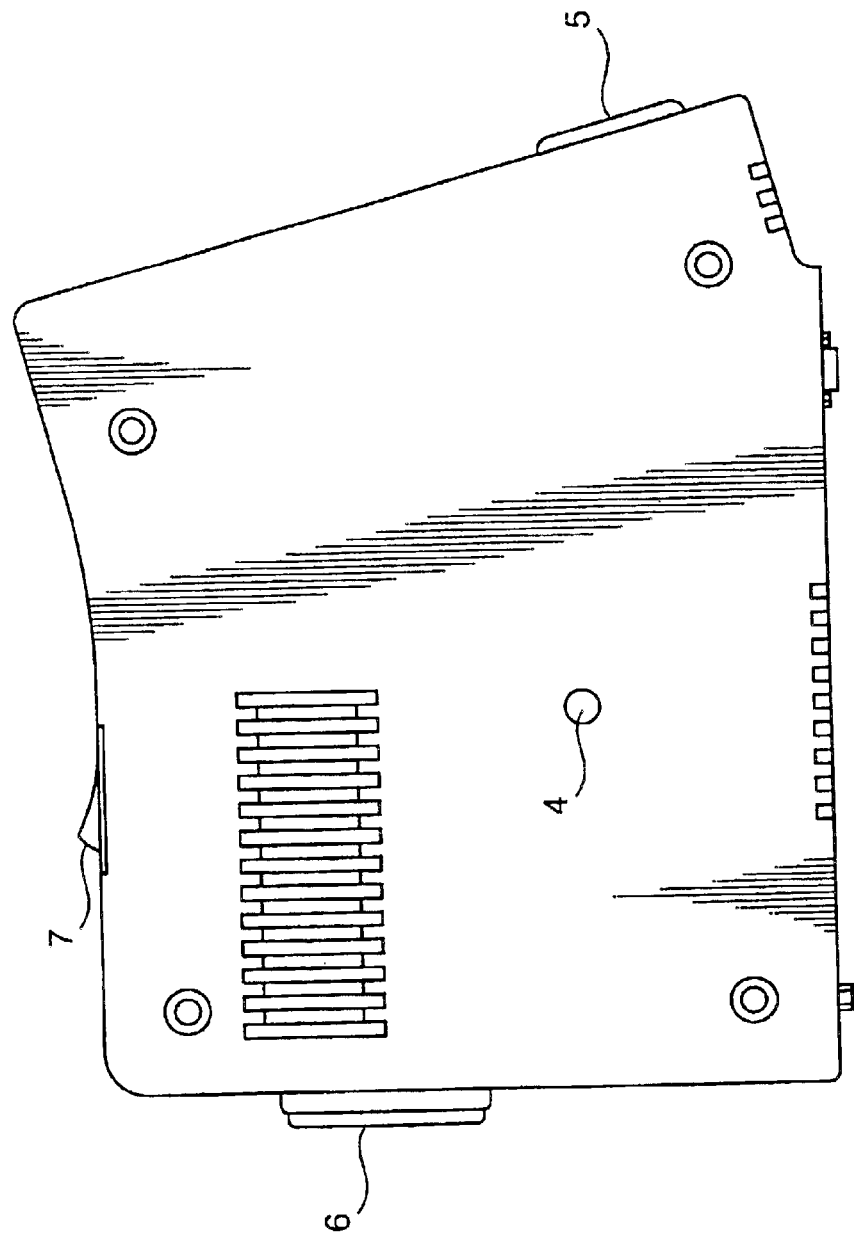
FIG. 4 is a side elevation of the temperature adjusting device shown in FIG. 3.
Figure 5:
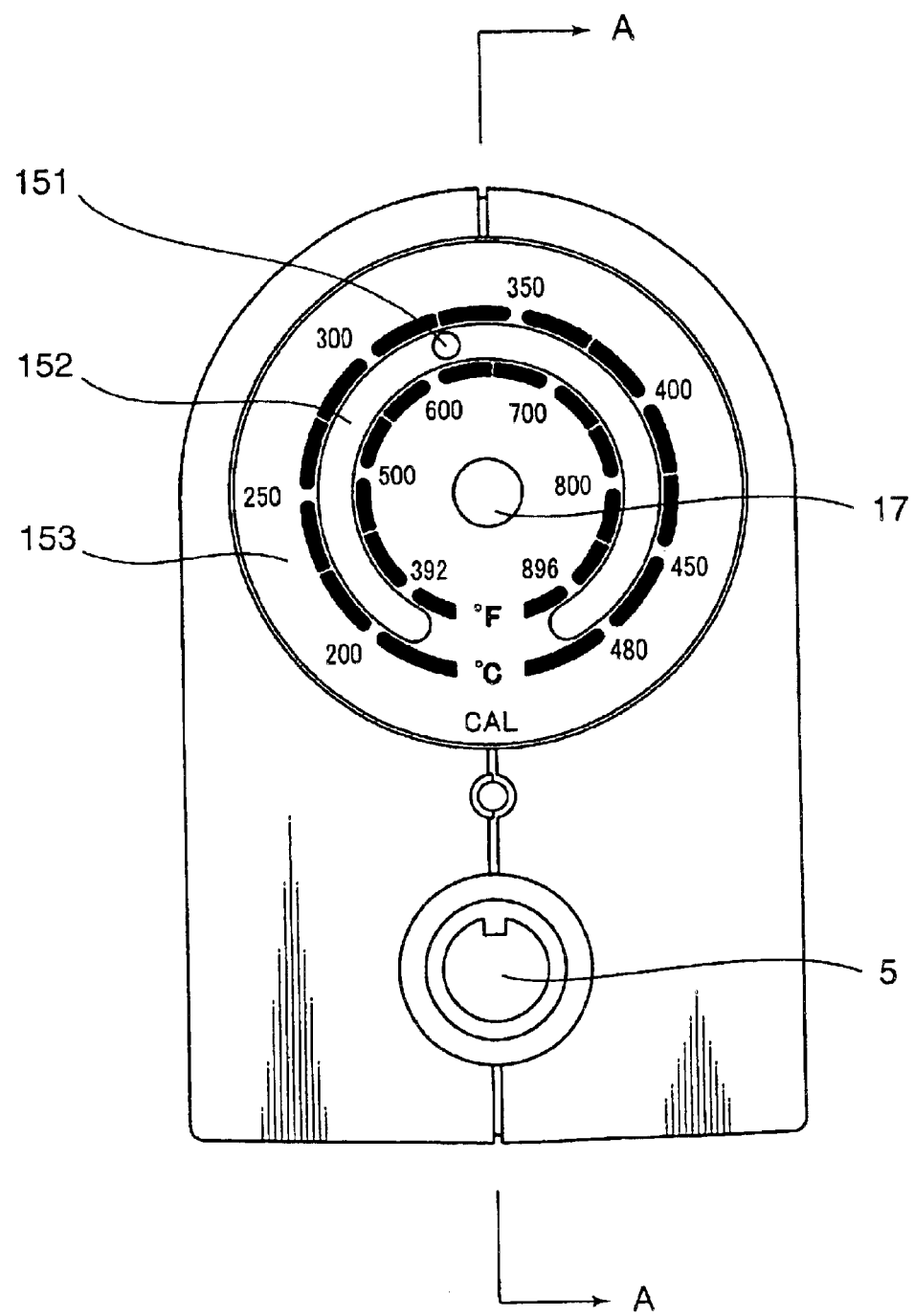
FIG. 5 shows a panel arrangement on the front plane of the temperature adjusting device shown in FIG. 3, as viewed in the direction normal to the plane of the panel.

Referring to FIGS. 3 through 5 showing the outer appearance of the temperature adjusting device according to an embodiment of the invention, the housing 8 has a front plane which has a semi-circular upper portion and a rectangular lower portion as seen in FIG. 5. A power switch 7 is provided on the top of the housing 8 to be operated to turn on and off a power source switch (not shown). A pair of through holes 4 and 4 are formed on opposite side walls of the housing such that the housing 8 is secured on a table or a wall of a room by means of a fixing member (not shown) having a pair of rods to be inserted in the through holes 4 and 4.

As shown in FIG. 5, a circular temperature indicating scale panel 153 is provided on the front plane. A transparent widow 152 is provided between the temperature scales such that the position of a LED (light emitting diode) 151 relative to the scales may be observed through the window. The LED 151 is located behind the window 152 to move in accordance with setting of the temperature of the tip as will be described later. At the center of the temperature indicating scale panel 153 is formed a through hole 17 through which a cylindrical engaging member 112 of the temperature setting member 11 is inserted into interior of the housing 8 to engage a rotary disk 154 which, in turn, is interconnected with an electric parameter changing member such as a variable resistor. (see FIGS. 6 and 7) The cylindrical engaging member 112 is integrally connected with a knob 111 which is manipulated by the authorized operator for the setting of the tip temperature. A socket 5 is provided below the temperature indicating scale panel 153 such that the soldering iron 2 is to be connected with the temperature setting device 1 through the socket 5.

Figure 6:
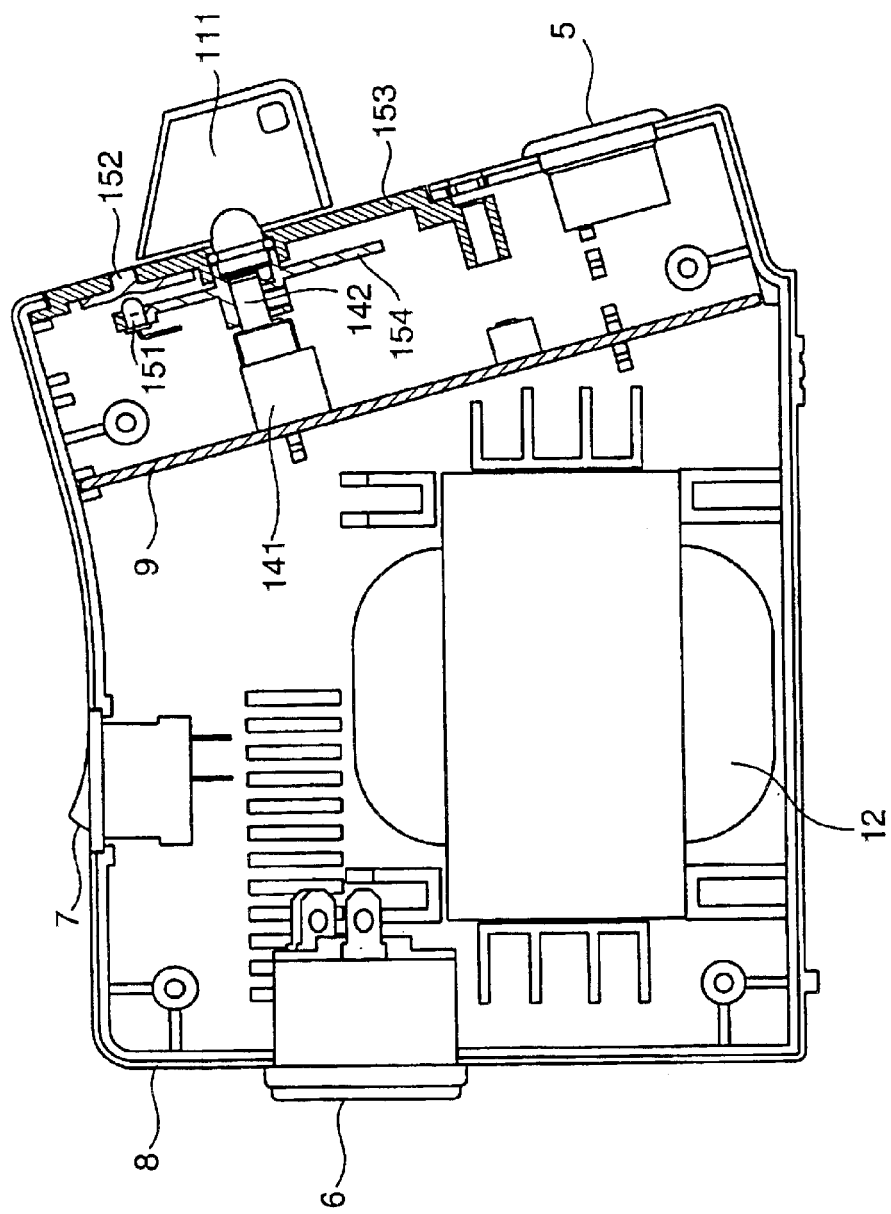
FIG. 6 is a cross sectional view of the of the temperature adjusting device taken along line A—A of FIG. 5.

Turning to FIG. 6, on the back plane of the housing 8 is provided a socket 6 through which the temperature setting device 1 is connected to the commercial AC power source 3. A printed circuit board 9 is fixedly mounted within the housing 8 in the front side (right side as seen in FIG. 6) of the housing 8. A variable resistor 141 of the temperature control 14 and other circuit elements are disposed on the printed circuit board 9. The temperature indicating scale panel 153 is disposed at the front of the housing 8. As shown in FIG. 6, the printed circuit board 9 and the temperature indicating scale panel 153 are in parallel with each other and slant from a vertical plane by a predetermined angle, e.g. 15 degree to face upward. The shaft 142 extending from the variable resistor 141 is normal to the printed circuit board 9. This slanted arrangement of the printed circuit board 9 and the temperature indicating scale panel 153 facilitates operation of the temperature setting device 1 even when it is placed below the head of the operator.

Figure 7:
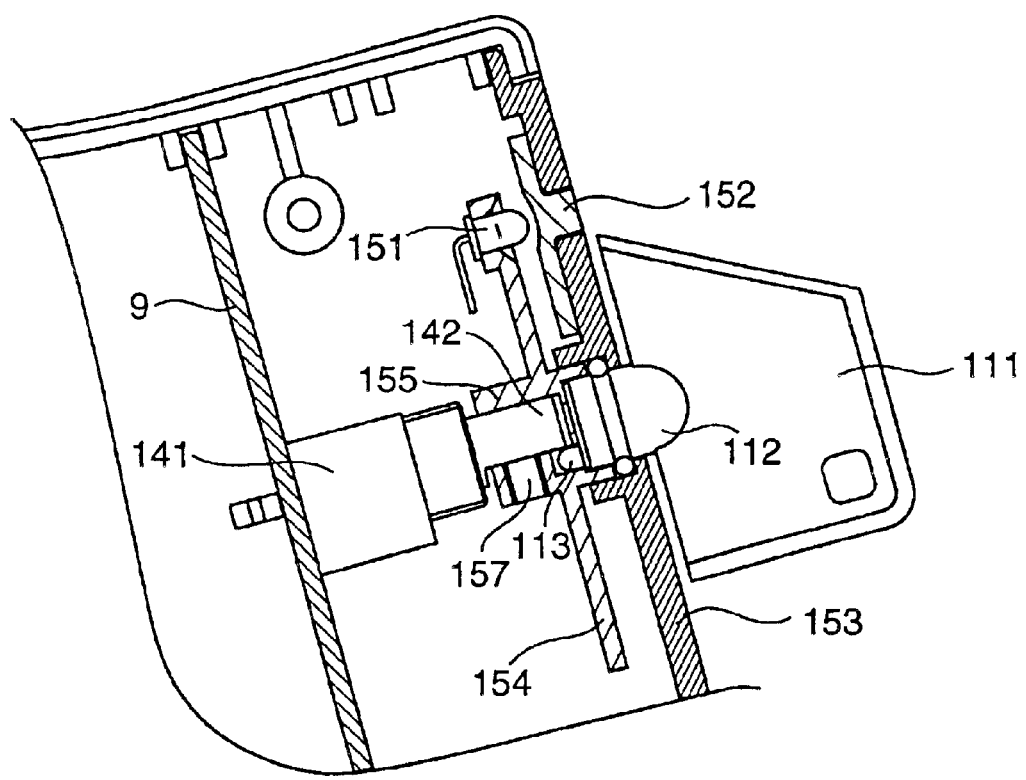
FIG. 7 is a partial enlarged sectional view of a temperature setting and indicating mechanism of the temperature adjusting device shown in FIG. 3.
Figure 8:
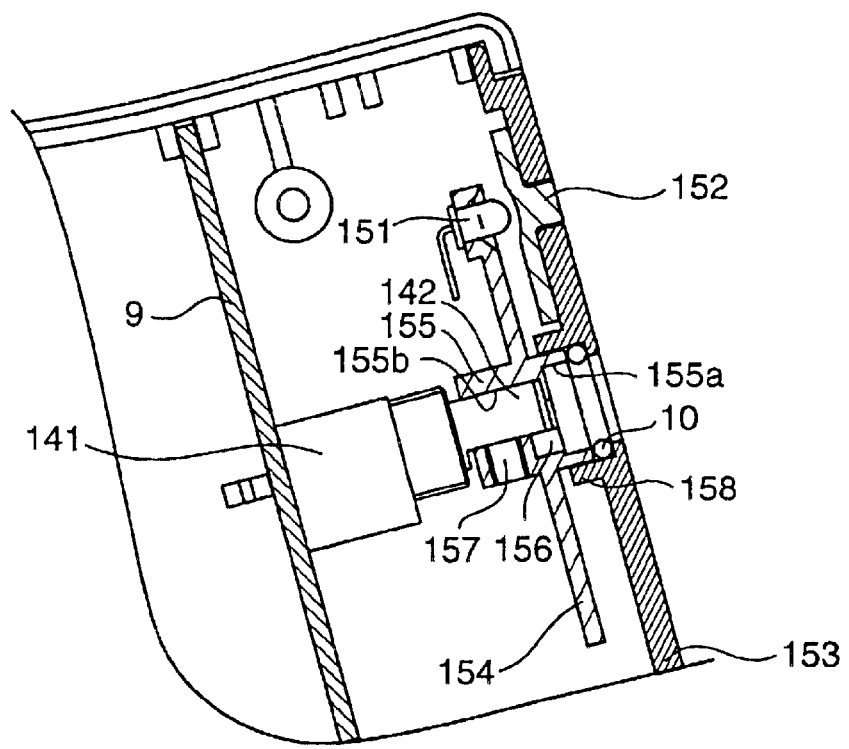
FIG. 8 is a same view as that of FIG. 7 but in a condition where a temperature adjusting knob has been removed.
Figure 9:
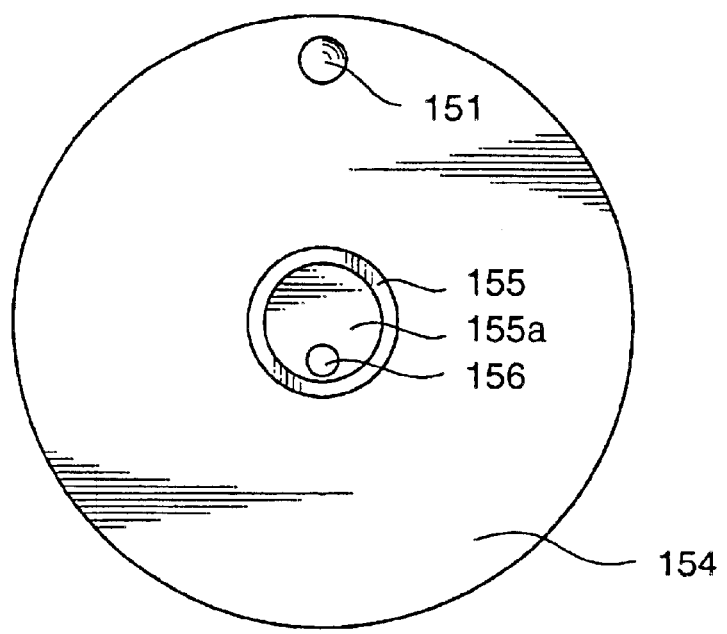
FIG. 9 is an enlarged front elevation of a rotary panel for temperature indication of the temperature adjusting device shown in FIG. 3.

Referring now to FIGS. 7, 8 and 10 which shows the detail of the temperature setting or adjusting mechanism according to the embodiment, the temperature setting member 11 is composed of the knob 111 and the cylindrical engaging member 112, while the temperature indicating section 15 is composed of the LED 151, the transparent widow 152, the temperature indicating scale panel 153 and the rotary disk 154. A mechanical part of the temperature control 14 includes the rotary shaft 142 and the variable resistor 141 which changes its resistance as a function of the rotation of the rotary shaft 142. The variable resistor 141 is electrically connected with a temperature control circuit to control the temperature of the tip of the soldering iron as is known per se in the art. FIG. 7 shows the condition wherein the knob 11a and the engaging member 112 is coupled with the rotary shaft 142 and the rotary disk 154, while FIG. 8 shows the condition when the knob 11a and the engaging member 112 have been removed.

As seen in FIGS. 7, 8 and 10, the variable resistor 141 is fixedly mounted on the printed circuit board 9 which, in turn, is fixedly mounted on the housing 8 of the temperature setting device 1. The rotary disk 154 is integrally and concentrically formed with a cylindrical portion 155. The cylindrical portion 155 extends on opposite sides of the rotary disk 154 and the rotary shaft 141 fits in the rear hole 155b of the cylindrical portion 155. The cylindrical portion 155 is formed with a radially extending screw hole 157 in which a fastening member such as a screw (not shown) is threaded to fix the rotary disk 154 on the rotary shaft 142. The front side extension of the cylindrical portion 155 is formed with a circular recess 155a having a bottom plane formed with a hole 156 which receives a pin or projection 113 fixed on the end plane of the engaging member 112 as will be described later.

The engaging member 112 has a cylindrical rod shape to fit in the circular recess 155a of the cylindrical portion 155 and the pin or projection 113 is eccentrically fixed on the end plane of the engaging member 112. When the engaging member 112 is inserted through the through hole 17 of the temperature indicating scale panel 153 and fitted in the circular recess 155a, the pin or projection 113 is adapted to fit in the hole 156 on the bottom of the circular recess 155a to co-rotatably couple the knob 111 with the rotary disk 154 and accordingly the rotary shaft 142. Thus, when the knob 111 under that co-rotatable coupling is turned by the authorized operator, the rotary disk 154 and the rotary shaft 142 is rotated by way of the pin or projection 113.

The LED 151 is fixedly mounted on a peripheral portion of the rotary disk 154 to rotate with the rotary disk 154. The transparent window 152 is circularly formed along the track of the movement of the LED 151 with the temperature scales (by centigrade and Fahrenheit) being arranged on the opposite sides of the transparent window 152 to indicate a set temperature as a function of the rotary position of the rotary disk 154.

With the above mentioned arrangement, the authorized operator who is in charge of controlling the temperature of the soldering iron 2, may hold the knob 111 and insert the engaging member 112 through the through hole 17 to fit the engaging member 112 in the circular recess 155a and fit the pin or projection 113 in the hole 156 to co-rotatably couple the knob 111 with the rotary disk 154. Then, the authorized operator may turn the knob 111 to rotate the rotary disk 154 and accordingly the LED 151, observing through the transparent window 152 the position of the LED 151 relative to the temperature scales to set the temperature of the tip to a desired value. The rotary shaft 142 co-rotatably connected with the rotary disk 154 also rotates with the rotary disk 154 to adjust the variable resistor 141 and set the temperature of the tip as a function of the set value of the variable resistor 141.

When the temperature of the tip has been set to the desired value as mentioned above, the authorized operator may remove the knob 111 from the temperature adjusting device 1 and take it away to keep it in his or her custody. A worker who performs the soldering, desoldering and/or reworking of electric parts, can not access the temperature setting mechanism to adjust the temperature of the tip. On the other hand, the authorized operator can access the temperature setting mechanism only by inserting the engaging member 112 in the through hole 17 to co-rotatably interconnect the engaging member 112 with the rotary disk 154 and the rotary shaft 142 via the fitting of the engaging member 112 in the circular recess 155a and the fitting of the pin or projection 113 in the hole 156. Unauthorized persons are prevented from accessing to the temperature adjusting mechanism only by taking away the knob 111 from the temperature adjusting device 1. Thus, the temperature of the tip is easily controlled by the authorized operator.

Referring to FIG. 8, the embodiment is provided with a holding ring 10 between the temperature indicating scale panel 153 and the rotary disk 154, in more detail, between the ring shaped portion 158 defining the through hole of the temperature indicating scale panel 153 and the front cylindrical portion 155 of the rotary disk 154. When the engaging member 112 is inserted through the through hole, the engaging member 112 passes through the holding ring 10 to be held thereby such that the engaging member 112 is fittingly held by the ring shaped portion 158 of the temperature indicating scale panel 153 without gap therebetween while the engaging member 112 is co-rotatably coupled with the rotary disk 154. With this mechanism, the knob 112 is smoothly turned to ensure accurate setting of the temperature. The holding ring 10 also serve to keep the fitting between the engaging member 112 and the ring shaped portion 158 even if the engaging member 112 is worn out by frequent and/or long time use of the knob 111 and the engaging member 112 for the temperature adjustment.

In the embodiment described above, a single pin or projection 113 is provided on the engaging member 112 for its co-rotatable coupling with the rotary disk 154. In lieu thereof, a plurality of pins may be provided on the engaging member to be fitted in corresponding holes formed on the bottom of the circular recess 155a of the front cylindrical portion 155 of the rotary disk 154. As another modification of the coupling structure between the engaging member 112 and the rotary disk 154, a pin or pins may be provided on the bottom of the recess 155a to fit in a hole or holes formed on the end plane of the engaging member 112. The coupling structure may take other forms, such as a recess or depression having a shape of a triangle, a rectangle or a key groove formed on one of the bottom of the recess 155a of the front cylindrical portion 155 and the end plane of the engaging member 112, and a projection of a corresponding or complementary shape on the other of the bottom of the recess 155a of the front cylindrical portion 155 and the end plane of the engaging member 112.

The set temperature indicating mechanism may also take other various forms than the LED 151 fixedly mounted on the peripheral portion of the rotary disk 154. For example, a light guide member such as a glass fiber or a glass rod may be provided on the rotary disk 154 to guide and emit toward the transparent window a light derived from an LED or electric lamp provided on the central portion of the rotary disk 154. In other modification, a slit or through hole may be formed on the rotary disk 154 and a light source may be provided on the back of the rotary disk 154 such that the light of the light source can been seen through the slit or through hole and through the transparent window 152. In this case, the angular position of the slit or through hole indicates the set temperature. In still further modification of the set temperature indication, the set temperature may be indicated by a digital LCD display or a plurality of LEDs which is selectively energized for the indication. In the latter case, the rotary panel may be dispensed with and the rotary shaft 142 is structured to be co-rotatably coupled with the engaging member 112, while the LCD or LED display may be connected with a circuit on the printed circuit board to be controlled thereby.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

From the foregoing detailed description, it will be evident that there are a number of changes, adaptations and modifications of the present invention which come within the province of those skilled in the art. The scope of the invention includes any combination of the elements from the different species or embodiments disclosed herein, as well as subassemblies, assemblies, and methods thereof. However, it is intended that all such variations not departing from the spirit of the invention be considered as within the scope thererof.

What is claimed is:

1. A temperature adjusting device for adjusting a temperature of a soldering iron, comprising:
    a temperature control section having a moveable member moveable to change an electric parameter as a function of the movement of the moveable member, the temperature control section controlling the temperature of the soldering iron in accordance with the electric parameter;
    a manipulation member which is to be detachably coupled to the moveable member to move the moveable member to change the electric parameter; and
    an indicator interrelated with the moveable member to indicate an adjusted temperature, the indicator being capable of making the indication even when the manipulation member has been detached from moveable member.

2. A temperature adjusting device according to claim 1, wherein the moveable member is rotatable, and the manipulation member includes a knob which is to be co-rotatably coupled with the moveable member to manually rotate the moveable member.

3. A temperature adjusting device according to claim 2, wherein the indicator includes an indication panel having a temperature scale, a rotary disk located behind the indication panel and rotatable with the moveable member, and a light emitting member mounted on the rotary disk and arranged to indicate the adjusted temperature with reference to the temperature scale.

4. A temperature adjusting device according to claim 3, wherein the light emitting member is a light emitting diode.

5. A temperature adjusting device according to claim 3 wherein the indication panel is slanted from a vertical plane.

6. A temperature adjusting device according to claim 3 wherein the indication panel is formed with a hole, the manipulation member further includes a cylindrical engaging member which is to be inserted through the hole of the indication panel to be co-rotatably coupled with the moveable member, said moveable member being located behind the indication panel to be moved by the cylindrical engaging member.

7. A temperature adjusting device according to claim 6, further comprising a holder for fittingly holding the cylindrical engaging member within the hole of the indication panel.

8. A temperature adjusting device according to claim 3, further comprising a sensor for detecting the temperature of the soldering iron, and wherein said temperature control section further includes a comparator for comparing the output of the sensor with a signal representative of a temperature set as a function the electric parameter determined by the movement of the moveable member, and a feedback circuit for controlling the temperature of the soldering iron in accordance with the comparison by the comparator.

9. A temperature adjusting device according to claim 1 further comprising a housing having a front plane on which an indication panel is located, and opposite side walls each of which is formed with a hole for fixing the housing.

10. A temperature adjusting device according to claim 1 further comprising a housing having a front plane on which an indication panel is located with a hole being formed on the indication panel, and wherein said movable member includes a rotary shaft and a rotary disk integrally coupled with the rotary shaft to co-rotate therewith, said manipulation member includes a knob and a cylindrical engaging member, the hole of the indication panel being capable of accepting the engaging member such that the engaging member can insert into the housing through the hole, the engaging member and the rotary disk having a coupler for co-rotatably coupling them.

11. A temperature adjusting device according to claim 10 wherein said indicator includes a light emitting member mounted on the rotary disk to rotate therewith, a scale formed on the indication panel along the track of the light emitting member, and a transparent window formed on the indication panel such that the light emitting member can be seen therethrough.

12. A system for adjusting temperature to control the temperature of a soldering iron, the system comprising:
a temperature setting member having a pin;
a temperature adjusting device having a temperature control that is adjustable to control the power delivered to the soldering iron, where the temperature control is adapted to releaseably couple to the pin of the temperature setting member to allow the temperature setting member to adjust the temperature control.

13. The system according to claim 12, further including an indicator coupled to the temperature control to indicate the adjustment made to the temperature control.

14. The system according to claim 12, where the temperature control is relatable relative to the temperature adjustment device, and the temperature setting member includes a knob that is co-rotatably coupled with the temperature control to manually rotate the temperature control.

15. The system according to claim 12, where the temperature adjusting device has an indication panel having a temperature scale, a rotary disk located behind the indication panel and rotatable with the temperature control, and a light emitting member mounted on the rotary disk and arranged to indicate the adjusted temperature with reference to the temperature scale.

16. The system according to claim 15, wherein the light emitting member is a light emitting diode.

17. The system according to claim 12, where the temperature adjusting device has an indication panel that is slanted from a vertical plane.

18. The system according to claim 12, where the temperature adjusting device has an indication panel that is formed with a hole, the temperature adjusting device further includes a cylindrical engaging member adapted to insert through the hole of the indication panel to co-rotatably couple with the temperature control that is positioned behind the indication panel to be moved by the cylindrical engaging member.

19. The system according to claim 18, further comprising a holding ring for holding the cylindrical engaging member within the hole of the indication panel.

20. The system according to claim 12, further including a sensor for detecting the temperature of the soldering iron, and the temperature adjusting device further includes a comparator for comparing the output of the sensor with a signal representative of a temperature set as a function the electric parameter determined by the movement of the temperature control, and a feedback circuit for controlling the temperature of the soldering iron in accordance with the comparison by the comparator.

21. The system according to claim 12, further including a housing having a front plane on which an indication panel is located, and opposite side walls each of which is formed with a hole for fixing the housing.

22. A temperature adjusting device for adjusting the temperature of a soldering iron, the device comprising:
means for engaging a temperature adjusting device with a temperature setting member to adjust the power provided to the soldering iron to control the temperature of the soldering iron; and
means for indicating on the temperature adjusting device the adjustment made by the temperature setting member.

23. The device according to claim 22, further including:
means for detecting the temperature of the soldering iron and comparing the temperature with a signal representative of the power provided to the soldering iron as the temperature by the adjustment of the temperature setting member; and
means for providing feedback to the temperature adjusting device in accordance with the comparison by the comparator.

24. A method for adjusting the temperature of a soldering iron through a temperature adjusting device, the method comprising:
engaging a temperature setting member with a temperature control that is moveable relative to a temperature adjusting device;
moving the temperature setting member to adjust the temperature of the soldering iron; and
disengaging the temperature setting member from the temperature control to set the temperature to the soldering iron to the adjusted temperature of the soldering iron.

* * * * *